US008548809B2

(12) United States Patent
Itaki et al.

(10) Patent No.: US 8,548,809 B2
(45) Date of Patent: Oct. 1, 2013

(54) VOICE GUIDANCE SYSTEM AND VOICE GUIDANCE METHOD USING THE SAME

(75) Inventors: Kanji Itaki, Kanagawa (JP); Michihiro Kawamura, Kanagawa (JP); Nozomi Noguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1652 days.

(21) Appl. No.: 11/153,366

(22) Filed: Jun. 16, 2005

(65) Prior Publication Data

US 2006/0116884 A1 Jun. 1, 2006

(30) Foreign Application Priority Data

Nov. 30, 2004 (JP) ................................. 2004-345500

(51) Int. Cl.
*G10L 13/08* (2013.01)
*G10L 17/00* (2013.01)
*G10L 15/26* (2006.01)
*G10L 13/00* (2006.01)
*G10L 21/00* (2013.01)

(52) U.S. Cl.
USPC ........... 704/260; 704/246; 704/235; 704/258; 704/270; 704/270.1; 704/275

(58) Field of Classification Search
USPC ................... 400/74; 711/115; 704/270–271, 704/246, 275, 258, 260, 274, 235; 715/705, 715/727, 729; 379/88.04
See application file for complete search history.

(56) References Cited

U.S. PATENT DOCUMENTS

| | | | | |
|---|---|---|---|---|
| 5,675,813 | A * | 10/1997 | Holmdahl | 713/310 |
| 5,715,412 | A * | 2/1998 | Aritsuka et al. | 715/729 |
| 5,737,393 | A * | 4/1998 | Wolf | 379/88.13 |
| 5,758,318 | A * | 5/1998 | Kojima et al. | 704/251 |
| 6,243,682 | B1 * | 6/2001 | Eghtesadi et al. | 704/270 |
| 6,317,823 | B1 * | 11/2001 | Wakai et al. | 712/220 |
| 6,499,084 | B2 * | 12/2002 | Kobayashi et al. | 711/115 |
| 6,527,171 | B1 * | 3/2003 | Brooks et al. | 235/379 |
| 6,612,759 | B2 * | 9/2003 | Fukano et al. | 400/74 |
| 6,624,803 | B1 * | 9/2003 | Vanderheiden et al. | 345/156 |
| 6,738,742 | B2 * | 5/2004 | Badt et al. | 704/270 |
| 6,917,911 | B2 * | 7/2005 | Schultz | 704/206 |
| 6,957,128 | B1 * | 10/2005 | Ito et al. | 701/1 |
| 7,107,219 | B2 * | 9/2006 | Nemoto | 704/271 |
| 7,228,229 | B2 * | 6/2007 | Odagawa et al. | 701/539 |
| 7,318,198 | B2 * | 1/2008 | Sakayori et al. | 715/729 |
| 7,480,620 | B2 * | 1/2009 | Bennett | 704/275 |
| 7,672,846 | B2 * | 3/2010 | Washio et al. | 704/251 |
| 2003/0028317 | A1 * | 2/2003 | Nagamune | 701/208 |
| 2003/0036909 | A1 * | 2/2003 | Kato | 704/275 |

(Continued)

FOREIGN PATENT DOCUMENTS

JP A 2003-140880 5/2003

OTHER PUBLICATIONS

Office Action issued in U.S. Appl. No. 11/110,799; mailed Jun. 8, 2010.

*Primary Examiner* — Edgar Guerra-Erazo
(74) *Attorney, Agent, or Firm* — Oliff & Berridge, PLC

(57) ABSTRACT

A voice guidance system for providing a guidance by voice concerning operations of an information processing apparatus, comprises a detector that detects that a predetermined function of the information processing apparatus is disabled, and a voice guidance unit that outputs a voice message reporting a reason why the predetermined function of the information processing apparatus is disabled, in response to the detection output of the detector.

26 Claims, 12 Drawing Sheets

(56) References Cited

U.S. PATENT DOCUMENTS

| | | | | |
|---|---|---|---|---|
| 2003/0158735 | A1* | 8/2003 | Yamada et al. | 704/260 |
| 2004/0210442 | A1* | 10/2004 | Glynn et al. | 704/275 |
| 2004/0225503 | A1* | 11/2004 | Hollander et al. | 704/270 |
| 2004/0228456 | A1* | 11/2004 | Glynn et al. | 379/88.01 |
| 2006/0146719 | A1* | 7/2006 | Sobek et al. | 370/238 |
| 2006/0209319 | A1* | 9/2006 | Ikeda et al. | 358/1.6 |
| 2007/0050190 | A1* | 3/2007 | Washio et al. | 704/249 |
| 2008/0306686 | A1* | 12/2008 | Nakayama | 701/211 |

* cited by examiner

| NO. | INPUT KEY | FUNCTION DESCRIPTION |
|---|---|---|
| 1 | F1 | HELP |
| 2 | F2 | READ OUT CURRENT CONTROL VALUES |
| 3 | F3 | READ OUT CURRENT CONTROL LABELS (NAMES) |
| 4 | F4 | READ OUT CURRENT CONTROL HELP (KEYBOARD OPERATION METHOD) |
| 5 | F5 | READ OUT INFO RELATED TO CURRENT CONTROL VALUES (ALTERNATIVES) |
| 6 | F6 | READ OUT ALL TAB SETTINGS |
| 7 | Shift+F6 | READ OUT DIALOG SETTINGS IN CURRENT TAB |
| 8 | F7 | READ OUT ALL SHORTCUTS IN CURRENT TAB |
| 9 | F8 | READ OUT CONSUMABLES INFORMATION |
| 10 | F9 | RESTORE ALL TO DEFAULTS |
| 11 | F10 | START |
| 12 | F11 | READ OUT MESSAGE AREA STATUS |
| 13 | F12 | DISCONTINUE READING |
| 14 | Shift+F12 | PAUSE READING TEMPORARILY |
| 15 | Tab | MOVE ON TO NEXT CONTROL |
| 16 | Shift+Tab | MOVE BACK TO PREVIOUS CONTROL |
| 17 | Esc | UNDO CHANGES IN CURRENT CONTROL VALUE |
| 18 | Alt+1 | FOCUS ON FIRST TAB |
| 19 | Alt+2 | FOCUS ON SECOND TAB |
| 20 | Alt+3 | FOCUS ON THIRD TAB |
| 21 | Ctrl*S | START READING |
| 22 | Space | IN CURRENT CONTROL BUTTONS, CONFIRM BUTTON<br>IN CURRENT CONTROL CHECKBOXES, CHECK |
| 23 | Alt+*(ROMAN CHARACTER) | SELECT CONTROL ON CURRENT TAB |
| 24 | Ctrl+Shift+Space | READ OUT ALL CURRENT WINDOWS |
| 25 | Ctrl+Shift+Enter | READ OUT ITEM DETAILS |
| 26 | Ctrl+Shift+Insert | READ OUT EDIT COMBO BOX CONTENT |

FIG.5

VOICE GUIDANCE SYSTEM AND VOICE GUIDANCE METHOD USING THE SAME

BACKGROUND OF THE INVENTION

1. Field of the Invention

The present invention relates to a voice guidance system for guiding operations of an information processing apparatus by voice and to a voice guidance method using such system. More particularly, the present invention relates to a voice guidance system which is designed so that, when an unselectable job command is selected, a message indicating the reason why the command is unselectable is given by voice, and to a voice guidance method using such system.

2. Description of the Related Art

Conventionally, it has been proposed to incorporate the principles of the universal design (i.e., to design products, services and environments to make them more usable by as many people as possible, regardless of ages, genders, races, and physical or mental abilities) into various types of information processing apparatuses such as facsimile machines, copy machines, multifunction devices, and personal computers.

Additionally, in recent years after the enforcement of Section 508 of the US Rehabilitation Act, there has been a trend in hardware manufacturers that provide these information processing apparatuses to customers to make research and development efforts based on cognition that their competitiveness is enhanced by providing equipment that is accessible more easily and is friendly to a larger number of people.

It is known to provide an information processing apparatus designed such that messages such as “paper out”, “toner out”, and “paper jam” are conveyed by voice, while BGM (Background Music) is played along with the voice guidance. The BGM is played constantly so that, even if the user is away from the apparatus when the voice guidance is given, he/she will be able to know the current condition of the apparatus upon returning to the machine.

In the above-mentioned information processing apparatus, for example, in a multifunction device, an operation panel as shown in FIG. 13 is typically provided in the apparatus body for displaying various screens and for inputting the user’s instructions. The operation panel shown in FIG. 13 displays a screen which allows the user to change various settings of commands related to the copying function. With this screen, the user is able to change the commands of “paper tray”, “magnification”, and “double/single-sided”. However, the command of “double/single-sided” is grayed out and is not selectable. Only the single-sided copying can be selected on this screen.

The double-sided printing function cannot be executed unless the multifunction device is provided with an automatic document feeder as an optional device. Therefore, the double-sided copying function will be disabled for the reason that an automatic document feeder is not provided, is out of order, or is not connected.

Such disabling procedure may be effective for general users (visually unimpaired people) who will be able to understand the apparatus condition immediately, but not so for visually impaired people who cannot visually recognize the information. If a visually impaired user performs a normal operation to select the double- or single-sided copying function under the condition of the double-sided copying function being disabled, the command will not be changed, or no voice guidance is provided to tell that the change has been done. The visually impaired user will be unable to even know why no voice guidance is given.

Even if voice guidance is given, according to a conventional art, such voice guidance directly conveys the message as displayed on the screen by voice merely to tell that the select button is grayed out or the function is disabled. Therefore, the visually impaired user is unable to even know the circumstances, being unable to understand why the function is disabled.

SUMMARY OF THE INVENTION

The present invention has been made in view of the above.

According to an aspect of the present invention, a voice guidance system for providing a guidance by voice concerning operations of an information processing apparatus, comprises a detector that detects that a predetermined function of the information processing apparatus is disabled; and a voice guidance unit that outputs a voice message reporting a reason why the predetermined function of the information processing apparatus is disabled, in response to the detection output of the detector.

According to another aspect of the present invention, a voice guidance method for a voice guidance system that provides a guidance by voice concerning operations of an information processing apparatus, comprises detecting, by detector, that a function of the information processing apparatus is disabled; and outputting, by a voice guidance unit, a voice guidance indicating the reason why the function of the information processing apparatus is disabled in response to the detection output of the detector.

BRIEF DESCRIPTION OF THE DRAWINGS

Embodiments of the present invention will be described in detail based on the following figures, wherein

FIG. 5 is a list showing an example of keyboard specifications of the special terminal for visually impaired users 40;

DESCRIPTION OF THE PREFERRED EMBODIMENTS

Detailed description will now be made of embodiments of a voice guidance system and a voice guidance method according to the present invention with reference to the attached drawings.

First Embodiment

Figure 1:
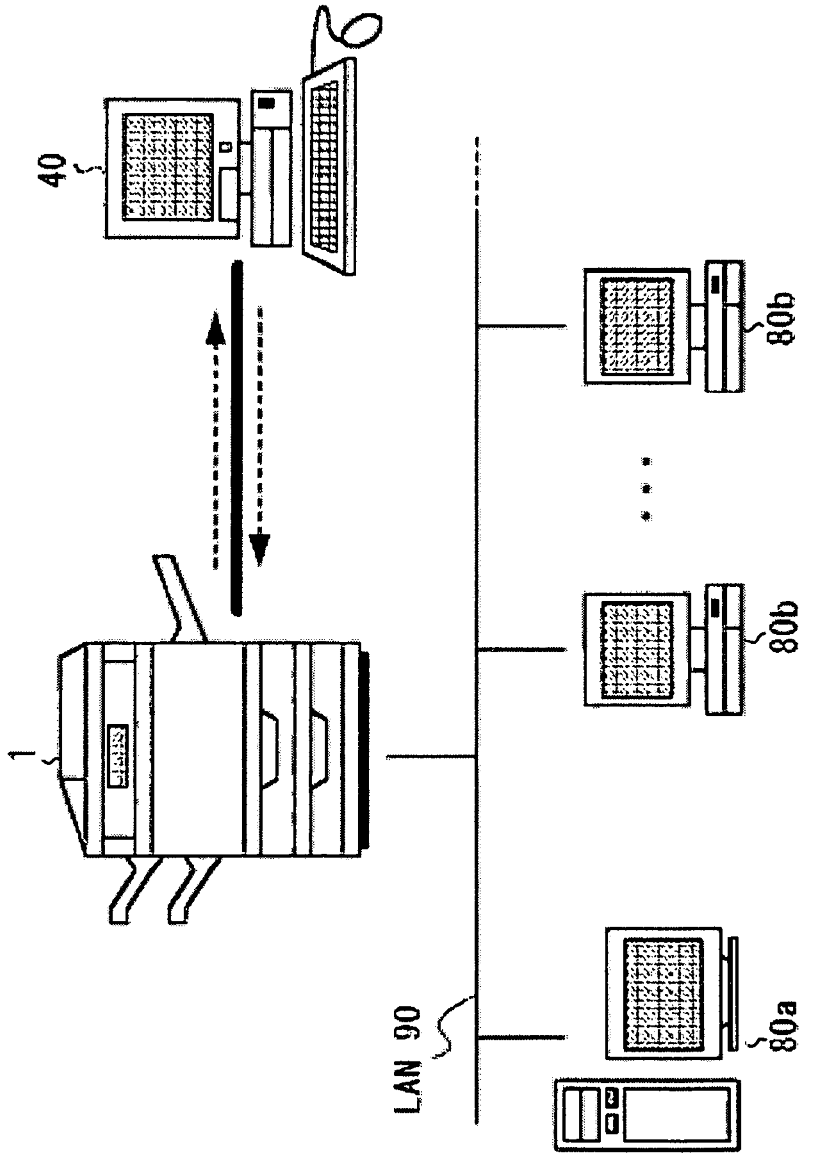
FIG. 1 shows an example of the overall structure of a voice guidance system to which the present invention is applied.

FIG. 1 shows an example of overall structure of a voice guidance system according to the present invention. In the first embodiment, the present invention is applied to a voice guidance system having a multifunction device 1 and a special terminal for visually impaired users 40.

The voice guidance system includes the multifunction device 1, the special terminal for visually impaired users 40, and an external terminal 80 including a server terminal 80*a* and client terminals 80*b*. This embodiment will be described of a case in which the multifunction device 1 is connected to the special terminal for visually impaired users 40 by a USB (Universal Serial Bus), and the multifunction device 1 is connected to the external terminal 80 by a LAN (Local Area Network) 90. However, the present invention is not limited to this way of connection, and any other way of connection may be employed so far as communication is possible among the apparatuses and the functions of the present invention can be executed.

The multifunction device 1 has copying, facsimile and scanning functions, and performs a job that is activated by any of an operation panel arranged in the multifunction device 1 itself, the client terminal 80*b*, and the special terminal for visually impaired users 40.

The special terminal for visually impaired users 40 is a personal computer operable by a visually impaired user. The visually impaired user operates an application than is run on the terminal to cause the multifunction device 1 to execute various jobs.

The special terminal for visually impaired users 40 is provided with a speaker so that voice guidance is output whenever required to assist a visually impaired user to operate the terminal. The voice guidance thus output does not necessarily correspond to the message displayed on the screen. If there is an unselectable job command, the voice guidance will tell the user why the command cannot be selected. For example, if the double-sided printing function is disabled because no necessary optional device is attached, the menu items relating to double-sided printing are grayed out on the screen. If a visually impaired user selects the double-sided printing without realizing that the corresponding menu items are grayed out, voice guidance is provided to tell that the double-sided printing cannot be selected because no automatic document feeder is attached.

The server terminal 80*a* and client terminals 80*b* together serving as the external terminal 80 are connected to the multifunction device 1 via the LAN 90 as described above. The server terminal 80*a* is a file server or the like which manages text files, while the client terminal 80*b* is a personal computer operated by a physically unimpaired user. For example, a user operating the client the terminal 80*b* is able to select a desired text file from y the server terminal 80*a* to instruct the multifunction device 1 to execute t the job of the selected file.

Description will now be made, with reference to FIGS. 2 and 3, of the system structure of the multifunction device 1 and the special terminal for visually impaired users 40 shown in FIG. 1.

Figure 2:
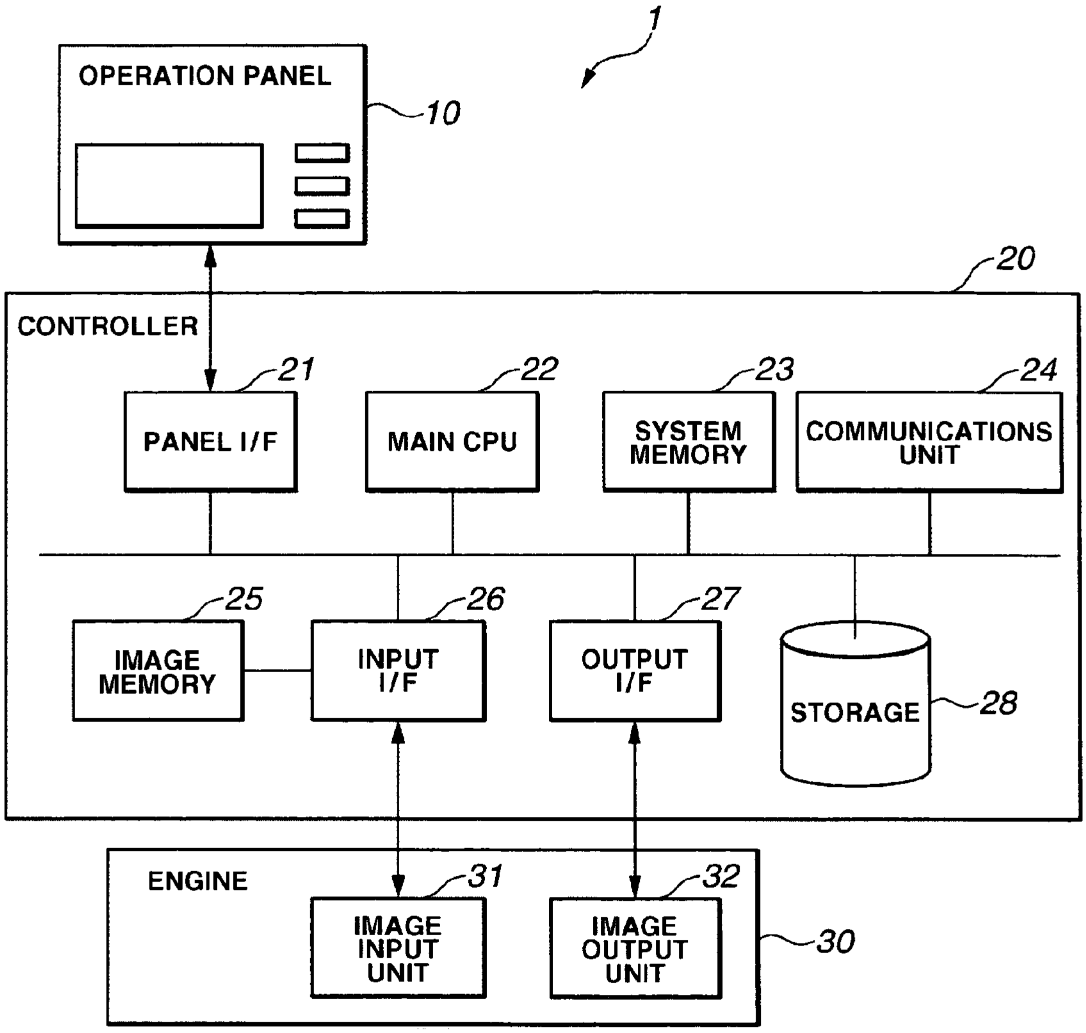
FIG. 2 is a block diagram showing a system structure of a multifunction device 1 according to a first embodiment of the present invention.

FIG. 2 is a block diagram showing the system structure of the multifunction device 1.

The multifunction device 1 is mainly formed by an operation panel 10 serving as an interface between the multifunction device 1 and the user, a controller unit 20 for performing overall control of the multifunction device 1, and an engine unit 30 for performing image input/output processing according to the instruction from the controller unit 20.

The operation panel 10 is a user interface provided with an inputting device such as a touch panel or hard buttons, and with a display device such as an LED (Light Emitting Diode) or LCD (Liquid Crystal Display).

The controller unit 20 includes a panel I/F (interface) 21 for exchanging data with the operation panel 10 described above, a main CPU (Central Processing Unit) 22 for controlling and managing operations of the units and components of the multifunction device 1 according a program that is installed in a system memory 23 to be described later, a system memory 23 that is a working area for executing the program, a communications unit 24 serving as an interface device for communicating with external apparatuses via a telephone line, a network or a USB, an image memory 25 for temporarily storing image data, an input I/F (Interface) 26 for exchange data such as input image data with an image input unit 31 to be described later, an output I/F (Interface) 27 for exchanging data such as output image data with an image output unit 32 to be described later, and a storage 28 for holding and managing various operation screens and operational information data.

The engine unit 30 includes an image input unit 31 such as a scanner device for reading image data formed on paper or the like, and an image output unit 32 such as a printer device for forming an image on paper or the like. These are the descriptions of the system structure of the multifunction device 1 of the present invention. Although not shown in FIG. 2, the multifunction device 1 is further provided with a voice output unit for outputting voice data, and a power controller or the like for controlling the power supply to the components of the multifunction device 1.

Figure 3:
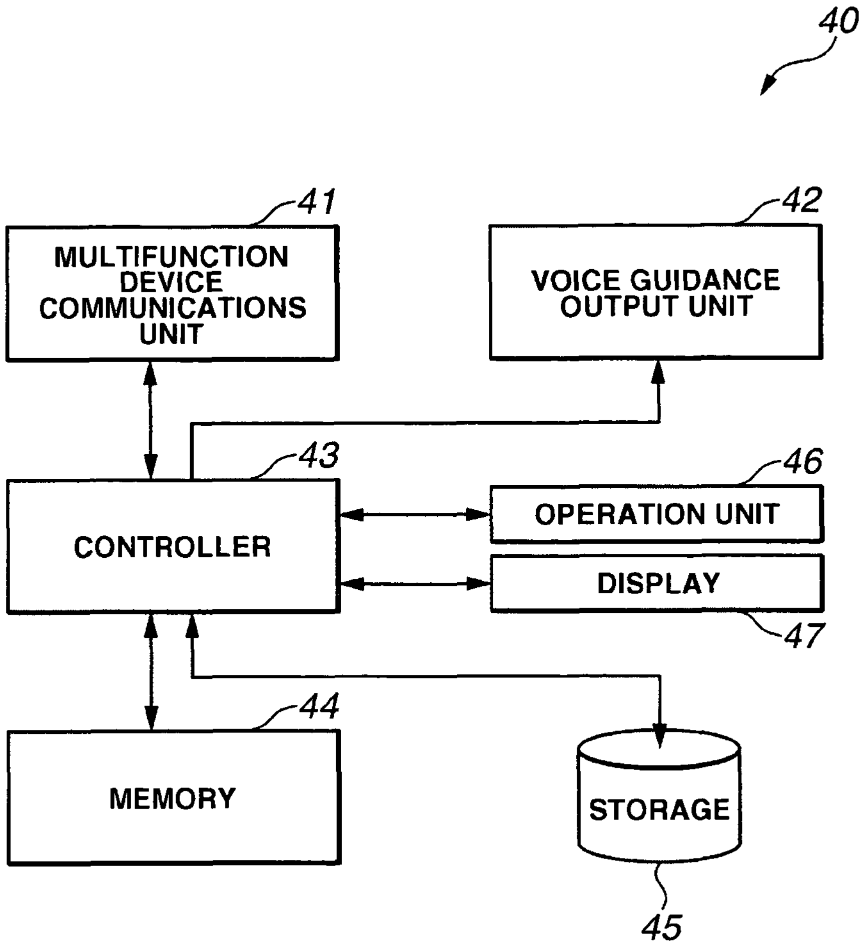
FIG. 3 is a block diagram showing a system structure of a special terminal for visually impaired users 40 according to the first embodiment of the present invention.

FIG. 3 is a block diagram showing the system structure of the special terminal for visually impaired users 40.

As mentioned before, the special terminal for visually impaired users 40 is a personal computer operated by a visually impaired user, and is connected to the multifunction device 1 by a USB cable so as to be communicable with each other.

The special terminal for visually impaired users 40 includes a multifunction device communications unit 41 for exchanging various control signals and data with the multifunction device 1, voice guidance output unit 42 that is a speaker for outputting voice data sent by the multifunction device 1, a controller 43 for performing overall control of the special terminal for visually impaired users 40, a memory 44 that is a working area for executing an application, an a storage 45 such as an HD (Hard Disk) or the like for storing various data including applications, an operation unit 46 such as a keyboard or mouse for inputting various data relating to execution of jobs, and a display 47 such as a display for displaying operation screens or the like.

Figure 4:
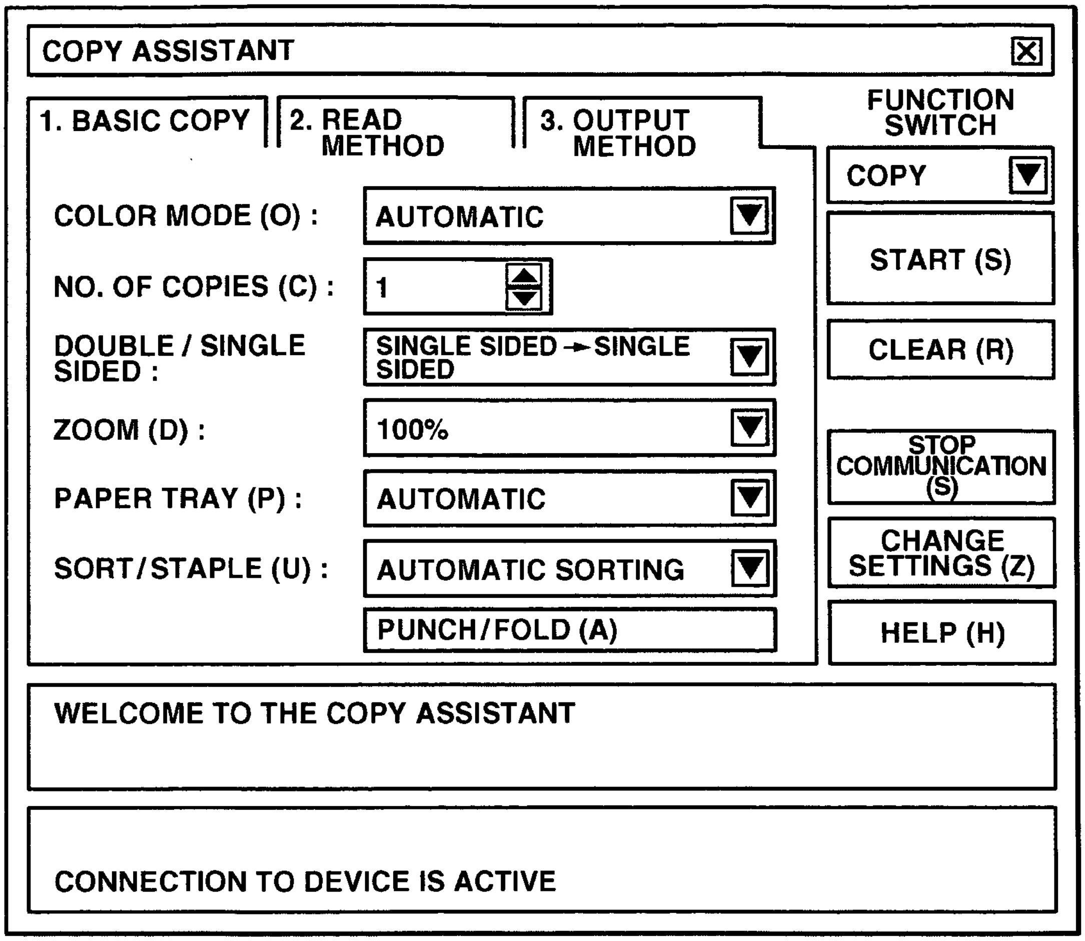
FIG. 4 shows an example of an application (Copy Assistant) screen displayed by the special terminal for visually impaired users 40.

An application (Copy Assistant) screen as shown in FIG. 4 is displayed on the display serving as the display 47. This screen allows the user to input various commands relating to execution of jobs that the user wants the multifunction device 1 to execute, such as copying job, facsimile job, and scanner job. The screen is designed to be friendly to visually impaired users. For example, when the mouse is operated to move the pointer to the position for selecting the double- or single-sided copying mode, voice guidance is output, saying "You can change the setting of the double- or single-sided mode. Please select one of single to single, single to double, double to single, and double to double". The visually impaired user is thus allowed to input various data to the screen following the voice guidance to cause the machine to execute the job.

The keyboard serving as the operation unit 46 is also designed to be friendly to visually impaired users, and has keyboard specifications as shown in FIG. 5 to realize key operation. For example, if the 'F2' key is pressed in the keyboard, voice guidance indicating a current command will be provided. These are the descriptions of the system structure of the special terminal for visually impaired users 40.

Figure 6:
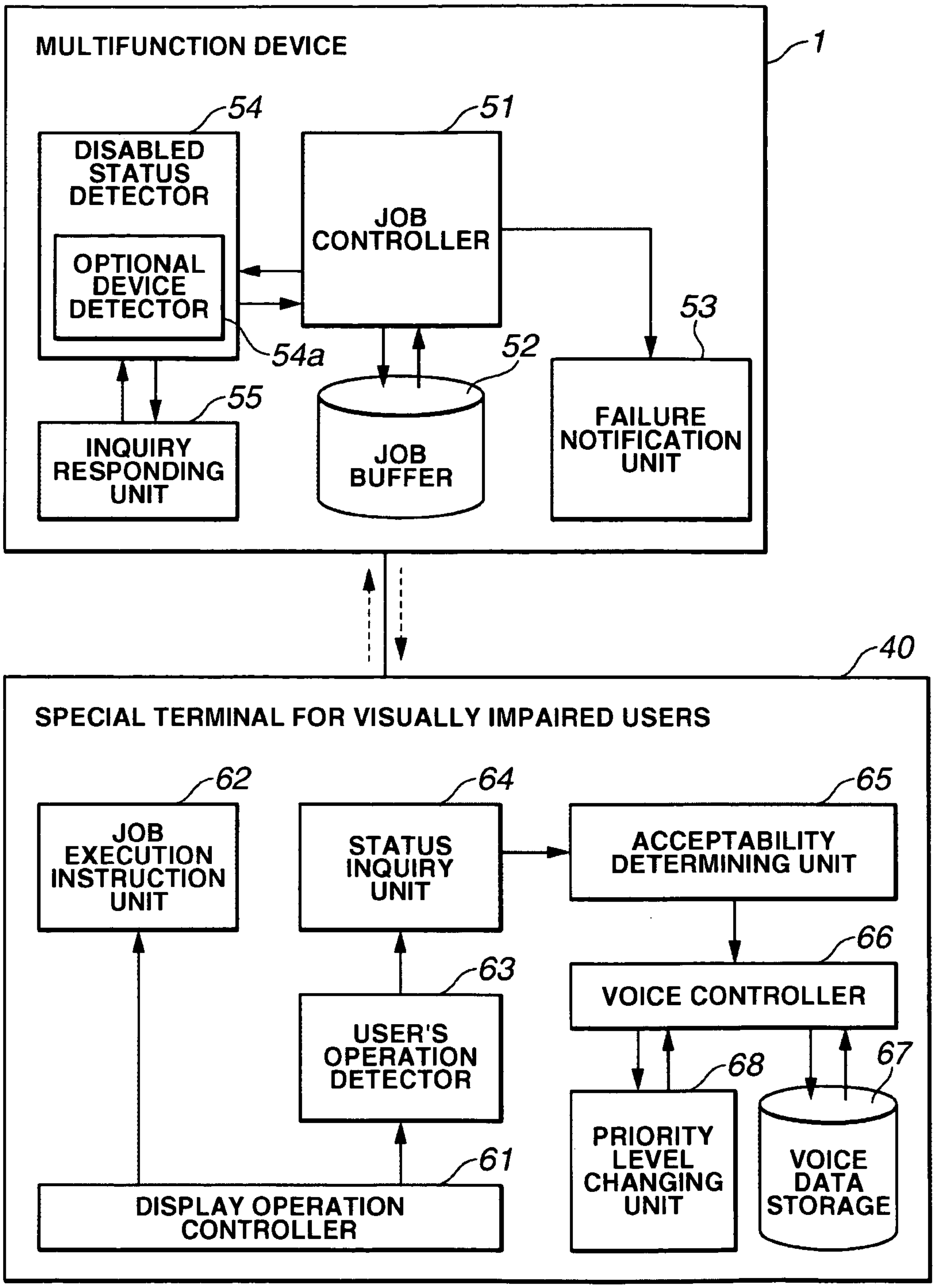
FIG. 6 is a block diagram showing a part of the functional structure of the multifunction device 1 and the special terminal for visually impaired users 40 according to the present invention.

FIG. 6 is a block diagram showing part of the functional structure of the multifunction device 1 and the special terminal for visually impaired users 40. Here, only the structural components pertinent to the present invention will be described.

The multifunction device 1 has various processing units including a job controller 51, a job buffer 52, a failure notification unit 53, a disabled status detector 54, and an inquiry responding unit 55.

The job controller 51 is a processing unit for performing control and management pertinent to jobs. More specifically, the job controller 51 generates a job in response to an instruction to execute the job that is sent from the operation panel 10, from the client terminal 80*b* via the LAN 90, or from the special terminal for visually impaired users 40. The job controller 51 then stores the job thus generated in the job buffer 52 to manage the same and controls the execution of the job.

The failure notification unit 53 is a processing unit for notifying, when a failure occurs during execution of a job by the job controller 51, the special terminal for visually impaired users 40 of the failure. Upon receiving this notification, the special terminal for visually impaired users 40 provides voice guidance of the failure in the job execution.

The disabled status detector 54 is a processing unit for detecting a function, among various functions the multifunction device 1 has, that is in the disabled status. The disabled status detector 54 has, in the interior thereof, an optional device detector 54*a* for detecting an optional device attached to the multifunction device 1. The disabled status detector 54 thus detects attachment or removal, or failure of the optional device to determine which function is disabled in the multifunction device 1.

In response to an inquiry request about disabled status from the special terminal for visually impaired users 40, the inquiry responding unit 55 returns a reply indicating a function, among various functions the multifunction device 1 has, that is determined by the disabled status detector 54 to be in the disabled status.

The special terminal for visually impaired users 40 has various processing units including a display operation controller 61, a job execution instruction unit 62, a user's operation detector 63, a status inquiry unit 64, an acceptability determining unit 65, a voice controller 66, a voice data storage 67, and a priority level changing unit 68.

Figure 7:
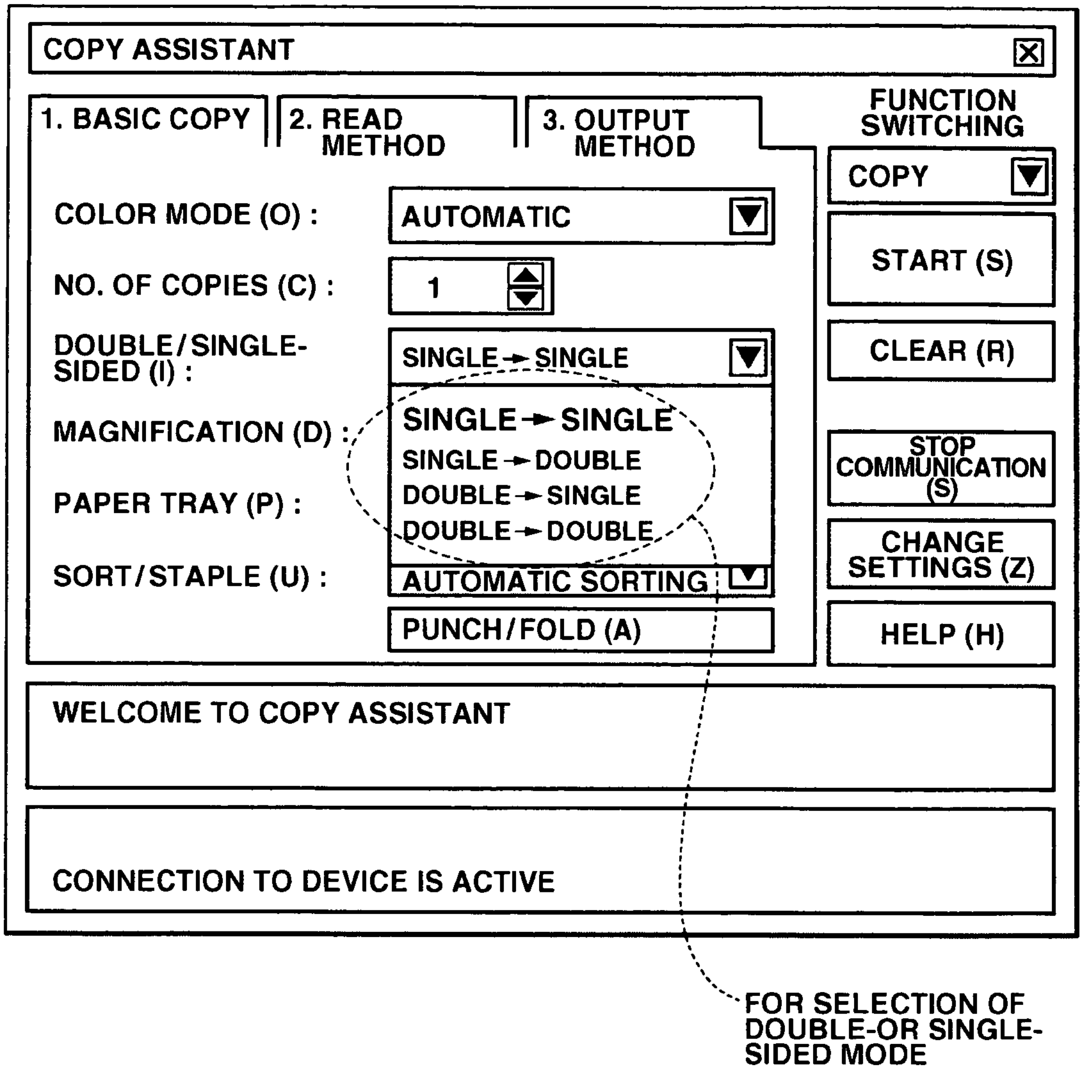
FIG. 7 shows an example of an application (Copy Assistant) screen (with grayed out display) displayed by the special terminal for visually impaired users 40.

The display operation controller 61 is a processing unit for performing control on operations including the input/output operation of the operation unit 46 and display 47 as described above with reference to FIG. 3. For example, if the multifunction device 1 has a disabled function, the display operation controller 61 controls the display of the Copy Assistant screen so that this function is grayed out on the screen as shown in FIG. 7. The double-sided printing mode of the single/double-sided printing mode selection is disabled, and the function commands pertinent to the double-sided printing mode are grayed out. If any of the grayed out commands or buttons is pressed, however, the pressing itself is rendered valid and voice guidance is provided by the voice guidance output unit 42 to tell the reason why the function of the pressed command cannot be selected.

The job execution instruction unit 62 is a processing unit for instructing activation of the job to be executed by the multifunction device 1. More specifically, when a visually impaired user uses the Copy Assistant screen shown in FIG. 4 to input various commands related to the job execution to instruct execution of the job, a job execution instruction is sent from the job execution instruction unit 62 to the multifunction device 1, and the job is generated by the job controller 51 of the multifunction device 1.

The user's operation detector 63 is a processing unit for detecting a user's operation on the multifunction device 1. More specifically, when a visually impaired user uses a keyboard or mouse provided to the special terminal for visually impaired users 40 to input various commands related to a job, the user's operation detector 63 detects the user's operation. Thereafter, the acceptability determining unit 65 to be described later determines whether the user's operation thus detected is acceptable or not.

The status inquiry unit 64 is a processing unit for sending a disabled status inquiry request to the multifunction device 1 whenever a user's operation is detected by the user's operation detector 63 to acquire information on the function that is in the disabled status in the multifunction device 1.

The acceptability determining unit 65 is a processing unit for acquiring information on the function that is in the disabled status in the multifunction device 1 to determine whether or not the detected user's operation is acceptable. For example, in case when an automatic document feeder (optional device) which enables the double-sided printing is not attached to the multifunction device 1, and yet the double-sided printing mode is selected, the user's operation detector 63 detects the fact that the user's operation has selected the double-sided printing mode. Along with the detection, the status inquiry unit 64 makes an inquiry about the function that is in the disabled status to the multifunction device 1. When a response indicating that the double-sided printing mode is disabled is returned to this inquiry, the acceptability determining unit 65 determines that the input user's operation is not acceptable.

The voice controller 66 is a processing unit for synthesizing voice data upon receiving the result of determination by the acceptability determining unit 65. For example, when the acceptability determining unit 65 determines that the setting of double-sided printing mode is an unacceptable user's operation, the voice controller 66 synthesizes voice data for providing voice guidance to tell the reason why the user's operation is not acceptable.

Additionally, when providing such voice guidance, the voice controller 66 changes the way of reading out the voice guidance message depending on its level of urgency and importance. For example, in case when paper jam, paper out or other failure which may stop the operation of the multifunction device 1 occurs, the voice message will be read out promptly and with the sound volume being increased. The voice data synthesized by the voice controller 66 is output as voice guidance from the voice guidance output unit 42 described above with reference to FIG. 3.

The voice data storage 67 is a storage device for storing various voice data. The voice controller 66 acquires necessary data from the various voice data stored in the voice data storage 67 to synthesize the voice data The priority level changing unit 68 is a processing unit for determining the priority level of voice guidance and changing the order of outputting the voice guidance according to the result of determination. Specifically, the level of urgency and importance is different between a condition where the operation of the multifunction device 1 may be stopped due to occurrence of a failure such as paper jam or paper out, and a condition where a function is disabled and cannot be selected. Therefore, the priority level changing unit 68 changes the priority level to change the order of outputting voice guidance so that priority is given to the outputting of voice guidance of a higher level of urgency or importance.

When an optional device is attached to or removed from the multifunction device 1, priority is given to the outputting of voice guidance reporting this attachment or removal. This is because a visually impaired user will be unable to visually notice such attachment or removal of the optional device, and hence will be unable to know whether the optional device is attached or not. Therefore, the voice guidance reporting the attachment or removal of the optional device is output in preference to other voice guidance. These are the descriptions of the processing and functional units of the multifunction device 1 and special terminal for visually impaired users 40 according to the present invention.

Figure 8:
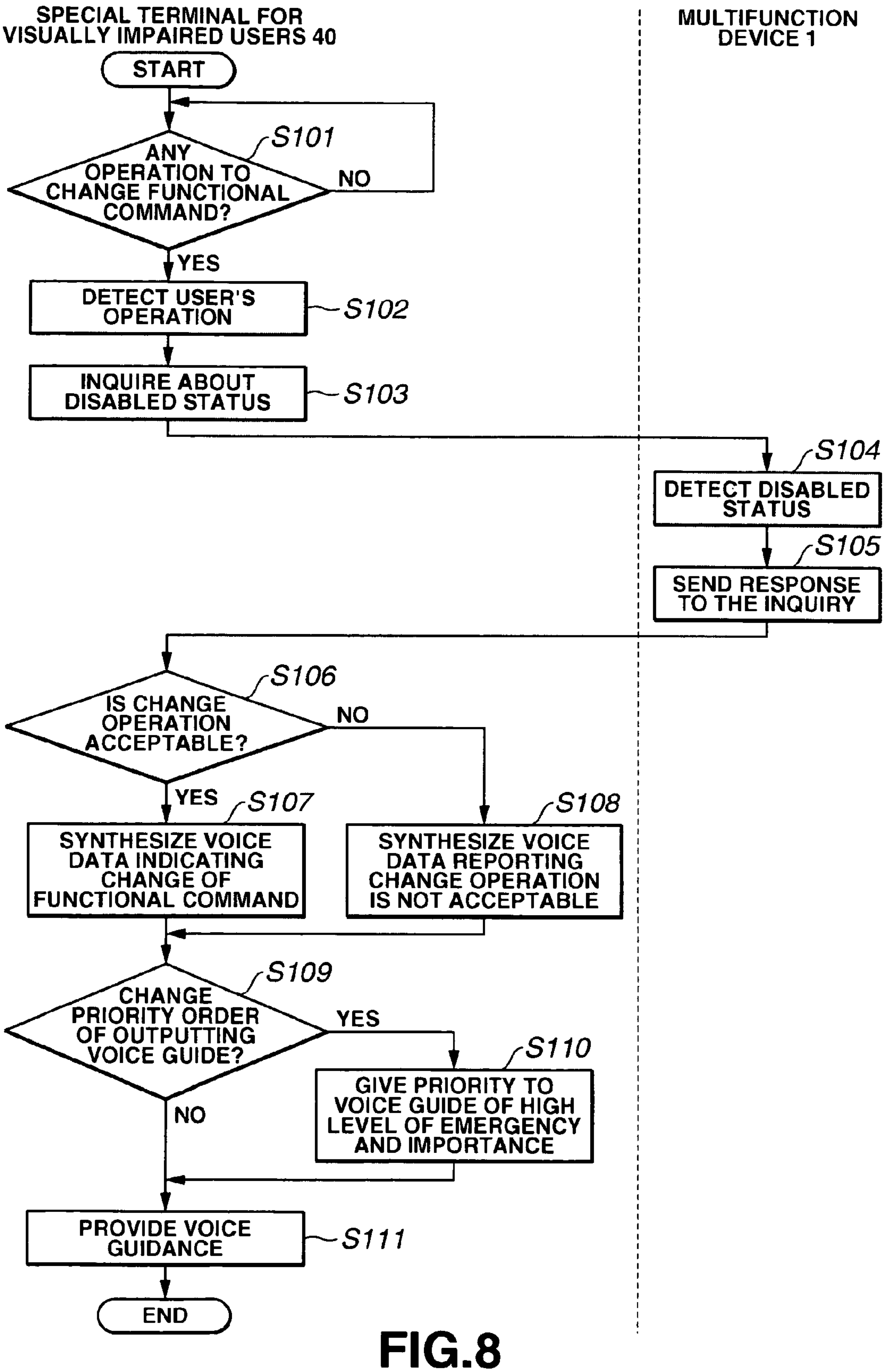
FIG. 8 is a flowchart illustrating the operation of the voice guidance system according to the first embodiment of the present invention.

Description will now be made of operation of the voice guidance system according to the present invention with reference to FIG. 8.

The special terminal for visually impaired users 40 stands ready until a visually impaired user manipulates the Copy Assistant screen as illustrated in FIG. 4 to change the function command related to a job, on the special terminal for visually impaired users 40 (NO in step S101). When the user uses a keyboard or mouse to change the job command (YES in step S101), the processing is started.

As the processing is started, the user's operation detector 63 detects that an operation has been performed on the special terminal for visually impaired users 40 to change the command pertinent to a job (step S102). Along with this detection, the status inquiry unit 64 makes a disabled status inquiry request to the multifunction device 1 to inquire whether if any function is disabled in the multifunction device 1 (step S1103).

Upon receiving the inquiry request, the multifunction device 1 detects a disabled function from among the various functions possessed by the multifunction device 1 (step S104). Specifically, the disabled status detector 54 and the optional device detector 54*a* provided therein detect together the functions possessed by the multifunction device 1 and the function that is disabled for the reason that the optional device is not attached. Information on the disabled function thus detected is then returned from the inquiry responding unit 55 to the special terminal for visually impaired users 40 (step S105).

Upon acquiring the information on the disabled function as a result of the inquiry, the acceptability determining unit 65 of the special terminal for visually impaired users 40 determines whether the user's operation detected by the user's operation detector 63 is acceptable or not (step S1106). If it is determined that the user's operation is acceptable (YES in step S106), the voice controller 66 synthesizes voice data indicating that the function command has been changed properly (step S107). If it is determined, however, that the user's operation is not acceptable (NO in step S1106), the voice controller 66 synthesize voice data indicating that the user's operation is not acceptable (step S108).

Subsequently, the priority level changing unit 68 determines whether the order of outputting the voice data synthesized by the voice controller 66 is to be changed or not. If it is determined that the order needs be changed, the priority level changing unit 68 changes the priority order of outputting the voice guidance (step S109). Specifically, since a failure such as paper jam or paper out will stop the operation of the multifunction device 1, the occurrence of such failure needs be reported to the user immediately. Therefore, the occurrence of such failure is reported while giving priority to the outputting of the voice guidance to that effect.

When a failure of a high level of urgency and importance exists (YES in step S109), the priority level changing unit 68 gives priority to the outputting of the voice guidance reporting of the failure (step S110), then the voice controller 66 outputs the voice guidance from the voice guidance output unit 42 (step S111), and the processing is terminated. When voice guidance is to be output to report that the failure is of a high level of urgency and importance, the voice controller 66 will synthesize voice data to produce the voice guidance so as to be emphasized in comparison with the voice guidance for reporting on that the user's operation is not acceptable. Thereby, the emphasized voice guidance is output with a different sound volume and different way of reading out the message from that for reporting that the user's operation is not acceptable, so that the user is allowed to know that the voice message being output is of a high level of urgency and importance.

In contrast, when no failure of a high level of urgency or importance exists (NO in step S109), the voice controller 66 outputs voice guidance from the voice guidance output unit 42 without changing the priority level (step S111), and the processing is terminated. For example, in case when an automatic document feeder (optional device) enabling the double-sided printing is not attached, and yet the double-sided printing mode is selected on the special terminal for visually impaired users 40, voice guidance will be provided to tell that the double-sided printing mode cannot be selected because no automatic document feeder is attached. Thereby, the visually impaired user will be allowed to know why the command cannot be selected.

As described above, according to the present invention, whenever an operation is performed to change a command related to a job on the special terminal for visually impaired users 40, it is determined whether the change operation performed on the special terminal for visually impaired users 40 is acceptable or not based on various functions possessed by the multifunction device 1 and on whether or not the optional device is attached. If it is determined that the operation is not acceptable, voice guidance is provided to tell the reason why the operation is not acceptable. As a result, a visually impaired user is allowed to know the reason why the command cannot be changed, without being confused. Thus, the voice guidance system of the present invention is capable of not only improving the operability and user-friendliness but also providing a feeling of security to users.

Second Embodiment

In the first embodiment, description has been made of the case in which it is determined whether or not a change operation performed on the special terminal for visually impaired users 40 is acceptable, based on various functions possessed by the multifunction device 1 or on whether or not the optional device is attached. A second embodiment of the present invention will be described of a case in which, when a function is rendered unselectable as a result of selection of another function (a function is disabled due to another function in effect), voice guidance is provided to tell the reason why that function is unselectable.

For example, all the commands relating to color printing are disabled while the monochrome printing mode is in effect. Therefore, the function commands relating to color printing are grayed out on the screen to inhibit selection of these function commands. However, a visually impaired user, who is unable to visually perceive the grayed out commands, may select a function command relating to color printing. In such a case, voice guidance is provided to tell the reason why that command is not selectable.

A multifunction device 1 and special terminal for visually impaired users 40 according to the second embodiment have the same structure as those of the first embodiment. Therefore, description will be made of the operation only, while omitting the description of the structure thereof.

Figure 9:
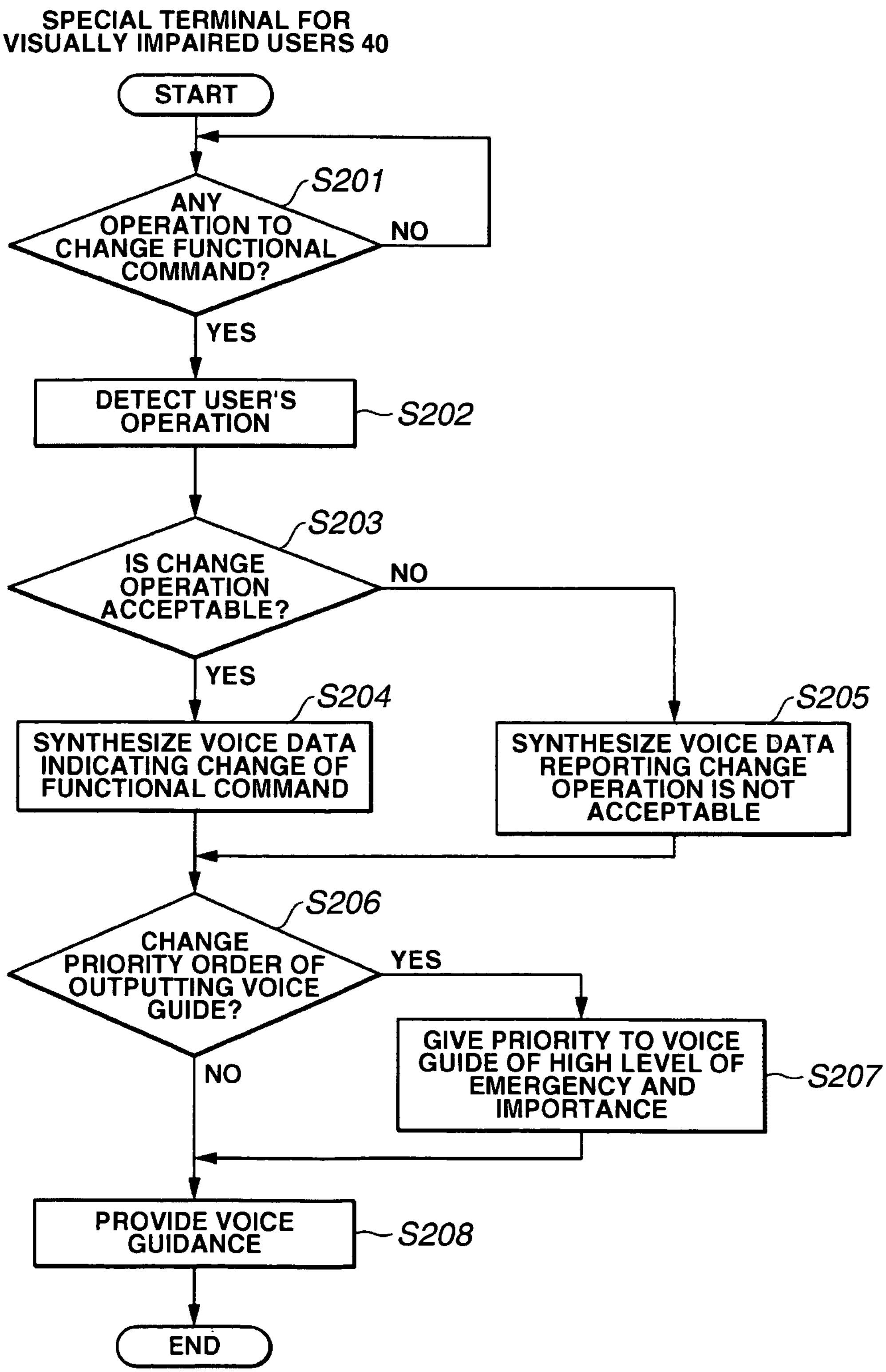
FIG. 9 is a flowchart illustrating the operation of the voice guidance system according to a second embodiment of the present invention.
Figure 10:
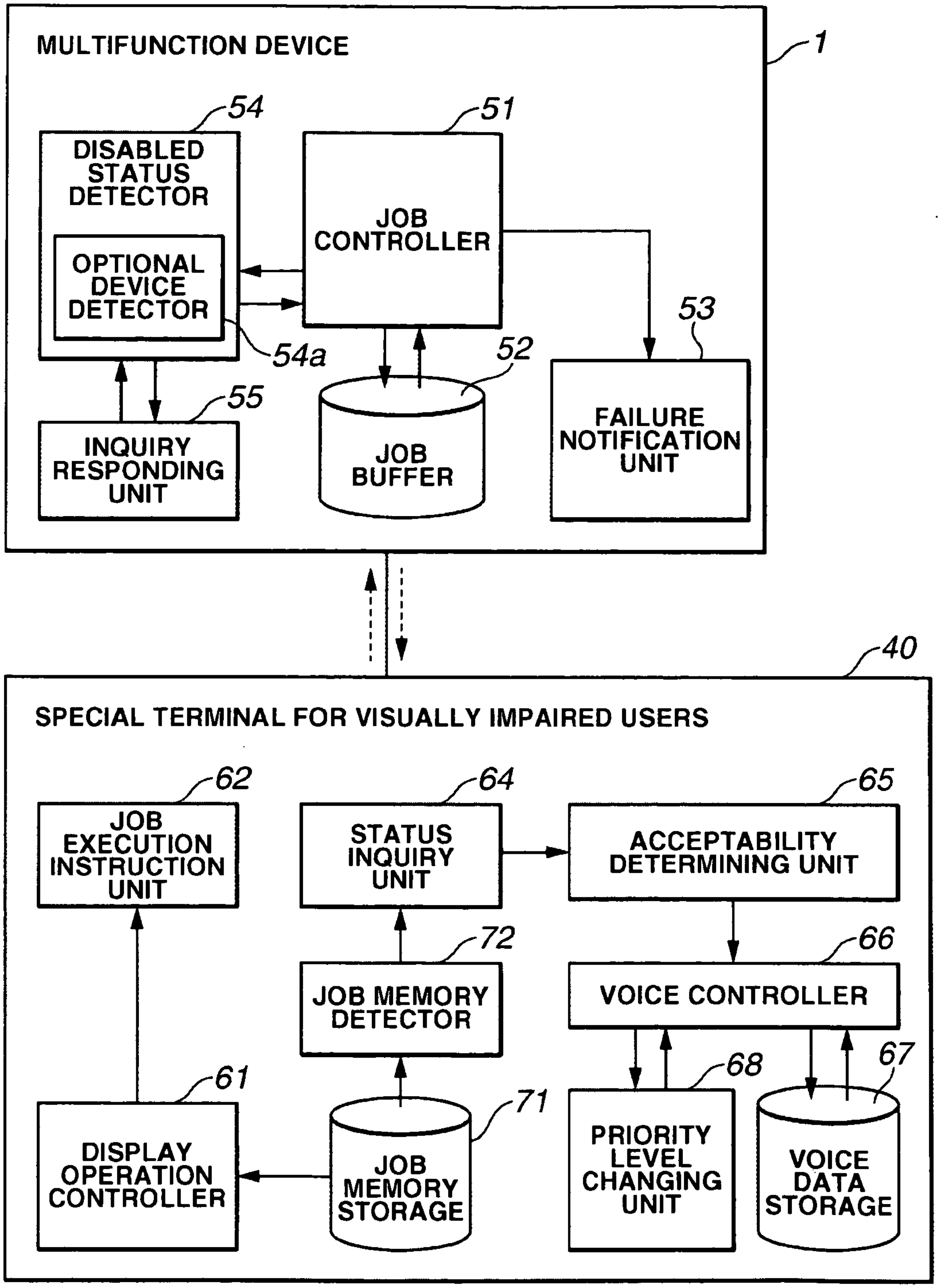
FIG. 10 is a block diagram showing a part of the functional structure of a multifunction device 1 and special terminal for visually impaired users 40 according a third embodiment of the present invention.

Operation of a voice guidance system according to the second embodiment will now be described with reference to FIG. 9.

The special terminal for visually impaired users 40 stands ready until a visually impaired user manipulates the Copy Assistant screen as shown in FIG. 4 to change the function command relating to a job, on the special terminal for visually impaired users 40 (NO in step S201). When the user uses a keyboard or mouse to change the job command (YES in step S201), the processing is started.

Upon start of the processing, the user's operation detector 63 detects that operation has been performed on the special terminal for visually impaired users 40 to change the job command (step S202). Along with the detection, the acceptability determining unit 65 determines whether or not the detected user's operation is acceptable (step S203). For example, in case when operation is performed to change a function command relating to color printing while the monochrome printing mode is in effect, the acceptability determining unit 65 determines that the user's operation is not acceptable.

If the user's operation is determined to be acceptable (YES in step S203), the voice controller 66 synthesizes voice data to tell that the function command has been changed (step S204). Whereas, if the user's operation is determined to be not acceptable (NO in step S203), the voice controller 66 synthesize voice data to tell the reason why the user's operation is not acceptable (step S205).

Subsequently, the priority level changing unit 68 determines whether or not the order of outputting the voice data synthesized by the voice controller 66 is to be changed. If it is determined necessary to change, the priority level changing unit 68 changes the order of outputting voice guidance (step S206). More specifically, since occurrence of a failure such as paper jam or paper out will stop the operation of the multifunction device 1, the user needs be notified of such failure immediately. Therefore, if such failure occurs, the voice guidance reporting such failure is output in preference to other voice guidance.

When a failure of high level of urgency and importance exists (YES in step S206), the priority level changing unit 68 gives priority to the outputting of the voice guidance to report such failure (step S207). The voice controller 66 then outputs the voice guidance from the voice guidance output unit 42 (step S208), and the processing is terminated. When voice guidance is output to report a failure of high level of urgency and importance, the voice controller 66 will synthesize voice data to produce the voice guidance so as to be emphasized in comparison with the voice guidance for reporting that the user's operation is not acceptable. Thereby, the emphasized voice guidance is output with a different sound volume and different way of reading out the message from that for reporting that the user's operation is not acceptable, so that the user is allowed to know that the voice message being output is of a high level of urgency and importance.

In contrast, when there no failure of high level of urgency or importance exists (NO in step S206), the voice controller 66 outputs the voice guidance from the voice guidance output unit 42 without changing the priority order (step S208), and the processing is terminated. For example, when an operation is made on the special terminal for visually impaired users 40 to change a function setting related to color printing while the monochrome printing mode is in effect, voice guidance is provided to tell that the functional command related to color printing cannot be changed since the monochrome printing mode is in effect. A visually impaired user is thus allowed to know the reason why the command cannot be changed.

According to the second embodiment as described above, even if a functional command that is disabled due to other function in effect (grayed out on the screen) is selected, voice guidance is provided to tell the reason why the command cannot be selected. Therefore, a visually impaired user is enabled to know the reason why the command cannot be selected without being confused. As a result, the second embodiment is also capable of not only improving the operability and user-friendliness but also providing a feeling of security to users.

Third Embodiment

In the above description of the first embodiment, it is determined whether or not a change operation made on the multifunction device 1 is acceptable based on the various functions possessed by the special terminal 40 or based on the fact whether the optional device is attached. A third embodiment of the present invention will be described of a case in which the special terminal for visually impaired users 40 is provided therein with a region for storing job memory consisting of a set of function settings, and when any of the function settings stored in the storage area as job memory is disabled, voice guidance is provided to tell the reason thereof.

Figure 11:
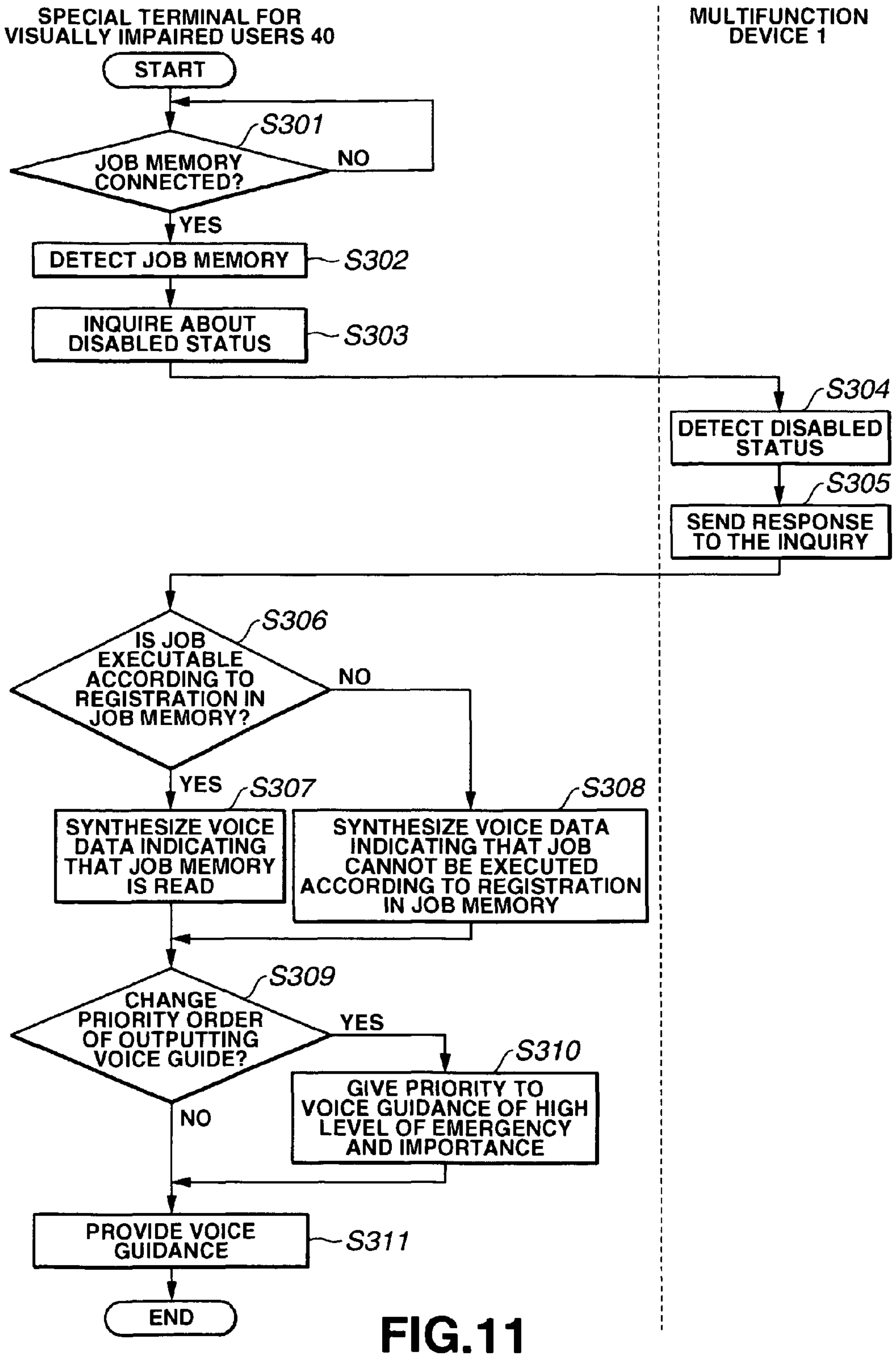
FIG. 11 is a flowchart illustrating the operation of the voice guidance system according to the third embodiment of the present invention.

FIG. 11 is a block diagram showing a part of the functional structure of a multifunction device 1 and a special terminal for visually impaired users 40 according to the third embodiment. Elements and components denoted by the same reference numerals as in FIG. 6 illustrating the first embodiment operate substantially in the same way as those of the first embodiment. Therefore, description thereof will be omitted.

The special terminal for visually impaired users 40 has various processing and functional units including a display operation controller 61, a job execution instruction unit 62, a status inquiry unit 64, an acceptability determining unit 65, a voice controller 66, a voice data storage 67, a priority level changing unit 68, a job memory storage 71, and a job memory detector 72. This means that the user's operation detector 63 is omitted from the structure shown in FIG. 6 illustrating the first embodiment and the job memory storage 71 and job memory detector 72 are added thereto.

The job memory storage 71 is a storage device for storing a set of plural function settings in association with a job. The plurality of function settings include those for changing the magnification, type of original document and paper tray, adjusting the copying density and eliminating the background, for each original document. Some of the function settings are for example on the premise that the optional device is attached. In such case, if the optional device is not attached, the related function settings stored in the job memory storage 71 are disabled. Specifically, a job involving the double-sided printing is preregistered in the job memory storage 71. If an automatic document feeder (optional device) which enables the double-sided printing is not attached when the registered content is read out from the job memory storage 71, the double-sided printing mode (function setting) cannot be executed.

The job memory detector 72 is a processing unit for detecting that the job memory storage 71 is connected to the special terminal for visually impaired users 40. When the connection of the job memory storage 71 is detected, the status inquiry unit 64 makes an inquiry whether or not there is any function disabled in the multifunction device 1. Upon acquiring information on the disabled function in response to the inquiry, the acceptability determining unit 65 determines whether or not the function setting stored in the job memory storage 71 is acceptable (executable). If determined to be not acceptable, voice guidance is provided, under the control of the voice controller 66, to tell the reason why the function setting stored in the job memory storage 71 is not executable. These are the descriptions of the various processing and functional units of the multifunction device 1 and special terminal for visually impaired users 40 according to the third embodiment.

Operation of the voice guidance system according to the third embodiment will now be described with reference to FIG. 11. The description herebelow will be made on the assumption that data is prestored in the job memory storage 71.

Upon connection of the job memory storage 71 to the special terminal for visually impaired users 40 (YES in step S301), the processing is initiated. Thereupon, the job memory detector 72 detects that the job memory storage 71 is connected to the special terminal for visually impaired users 40 (step S302). Along with the detection, the status inquiry unit 64 makes a disabled status inquiry request to the multifunction device 1 to inquire if there is any disabled function in the multifunction device 1 (step S303).

Upon receiving the inquiry request, the multifunction device 1 detects a disabled function from among the various functions possessed by the multifunction device 1 (step S304). Specifically, the disabled status detector 54 and the optional device detector 54*a* provided therein detect a function that is disabled due to another function possessed by the multifunction device 1, or non-attachment of the optional device. Information on the disabled function thus detected is returned to the special terminal for visually impaired users 40 from the inquiry responding unit 55 (step S305).

Upon acquiring the information on the disabled function in response to the inquiry, the acceptability determining unit 65 of the special terminal for visually impaired users 40 determines whether or not the function setting stored in the job memory storage 71 is acceptable (executable) (step S306). This processing is performed for determining whether the function setting stored in the job memory storage 71 is executable or not. For example, if the function setting stored in the job memory storage 71 cannot be executed due to a change in the provision of the optional device in the multifunction device 1, it is determined that the function setting is not acceptable.

If it is determined that the function setting stored in the job memory storage 71 is acceptable (YES in step S306), then the voice controller 66 synthesize voice data to tell that data in the job memory storage 71 has been read out normally (step S307). In contrast, if it is determined that the function setting stored in the job memory storage 71 is not acceptable (NO in step S306), the voice controller 66 synthesize voice data to tell the reason why the function setting stored in the job memory storage 71 is not acceptable (step S308).

Subsequently, the priority level changing unit 68 determines whether the order of outputting the voice data synthesized by the voice controller 66 is to be changed or not. If determined necessary, the order of outputting the voice guidance is changed (step S309). Specifically, since occurrence of a failure such as paper jam or paper out will stop the operation of the multifunction device 1, the occurrence of such failure needs be promptly reported to the user. Therefore, in case when such failure has occurred, the voice guidance reporting the failure is output in preference to other voice guidance.

If a failure of high level of urgency and importance exists (YES in step S309), the priority level changing unit 68 gives priority to the outputting of the voice guidance reporting the failure (step S310). The voice controller 66 then outputs the voice guidance from the voice guidance output unit 42 (step S311), and the processing is terminated. When voice guidance is output to report that the failure is of high level of urgency and importance, the voice controller 66 will synthesize voice data to produce the voice guidance so as to be emphasized in comparison with the voice guidance for reporting that the user's operation is not acceptable. Thereby, the emphasized voice guidance is output with a different sound volume and different way of reading out the message from that for reporting that the user's operation is not acceptable, so that the user is allowed to know that the voice message being output is of a high level of urgency and importance.

In contrast, if no failure of high level of urgency or importance exists (NO in step S309), the voice controller 66 outputs the voice guidance from the voice guidance output unit 42 without changing the priority level (step S311), and the processing is terminated. For example, if the function setting stored in the job memory storage 71 is not executable due to a change in the provision of the optional device, voice guidance is provided, saying that "the job XX has been read out from the job memory, but no setting for double-sided printing is possible because no automatic document feeder is attached". Thereby, a visually impaired user will be enabled to know the reason why the function setting stored in the job memory storage 71 cannot be executed.

According to the third embodiment as described above, connection of the job memory storage 71 to the special terminal for visually impaired users 40 is first detected. When a function setting stored in the job memory storage 71 cannot be, executed due to a change in the provision of the optional device, voice guidance is provided to report the reason thereof. Therefore, a visually impaired user is allowed to know, without being confused, why the function setting stored in the job memory storage 71 cannot be executed. As a result, the third embodiment is also capable of not only improving the operability and user-friendliness but also providing a feeling of security to users.

Figure 12:
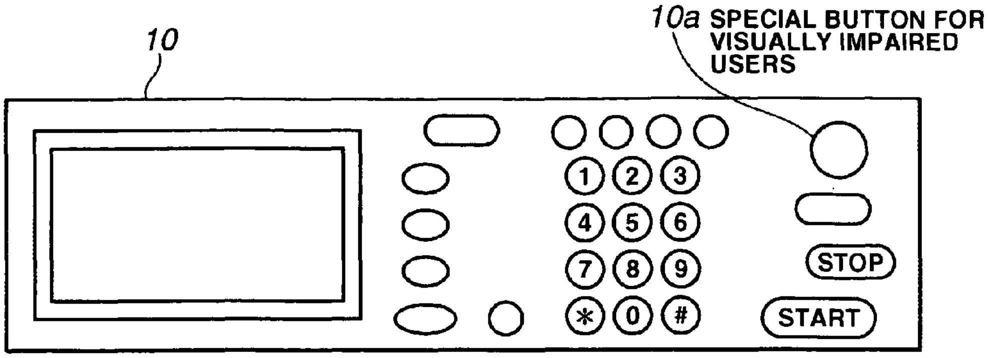
FIG. 12 shows an example of a layout of the operation panel 10.
Figure 13:
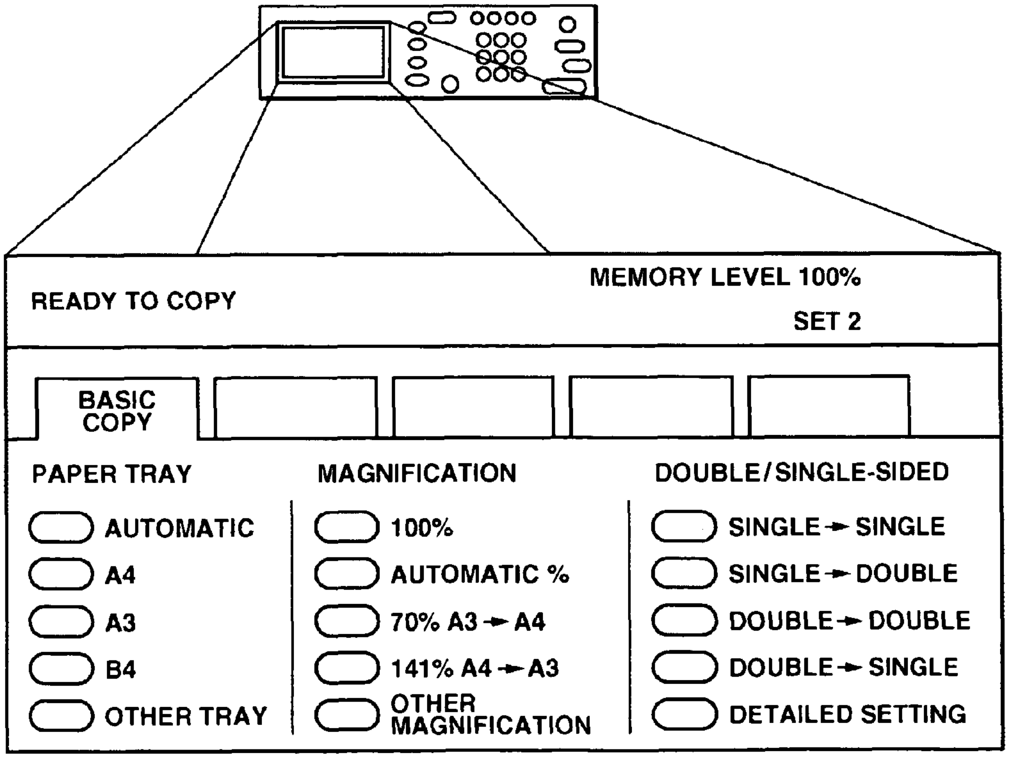
FIG.13 RELATED ART
FIG. 13 is a diagram illustration problems associated with conventional techniques.

Descriptions of the first to third embodiments above have been made for a case in which, when a job is executed by a visually impaired user, the job is activated by the special terminal for visually impaired users 40. However, the present invention is not limited to this. For example, as shown in FIG. 12, a special button for visually impaired users 10*a* may be provided in the inputting device (operation buttons) on the operation panel 10, so that a visually impaired user can press the button so that the job is activated by the multifunction device 1. In this case, as the special button for visually impaired button 10*a* is pressed, the voice guidance as described above will be provided by a speaker provided in the multifunction device 1.

Further, the descriptions of the first to third embodiments above have been made for a case in which the voice guidance system according to the present invention is applied to the multifunction device 1 and special terminal for visually impaired users 40. However, the present invention is not limited to this, and may be applied to a personal computer or the like.

When the present invention is applied to a personal computer, for example, the guide system may be designed such that upon detecting that a USB memory or memory card storing various settings is connected to the personal computer, the consistency of the stored settings is checked to provide voice guidance to report any items of settings that are not consistent.

It should also be understood that the present invention is not limited to the preferred embodiments as described above and shown in the accompanying drawing, but may be modified in various ways without departing from the spirit or scope of the invention. Although the voice guidance system according to the present invention has been described in its preferred forms of the first to third embodiments above, the present invention may be embodied by combining all or part of the first to third embodiments.

The voice guidance system and voice guidance method according to the present invention are applicable to various types of information processing apparatuses overall, and are particularly useful for creating better office environments to enable visually impaired people (people with amblyopia, reduced vision or total blindness) to work more comfortably and efficiently.

As described above, according to an aspect of the present invention, a voice guidance system for providing a guidance by voice concerning operations of an information processing apparatus, comprises a detector that detects that a predetermined function of the information processing apparatus is disabled; and a voice guidance unit that outputs a voice message reporting a reason why the predetermined function of the information processing apparatus is disabled, in response to the detection output of the detector.

According to another aspect of the present invention, in the voice guidance system according to the first-mentioned aspect of the present invention, the detector comprises an optional function detector that detects that an optional function is added to or removed from the information processing apparatus; a user's operation detector that detects a user's operation performed on the information processing apparatus by a user; and a determining unit that determines, upon detection of the user's operation by the user's operation detector, whether the user's operation is acceptable or not, with reference to a detection result by the optional function detector, wherein the voice guidance unit synthesizes voice guidance information indicating the disabled function and the reason thereof based on a result of determination of the determining unit, and outputs the synthesized voice guidance information by voice.

According to still another aspect of the present invention, in the voice guidance system according to the first-mentioned aspect of the present invention, the detector comprises a user's operation detector that detects a user's operation performed on the information processing apparatus by a user; and a determining unit that determines, upon detection of the user's operation by the user's operation detector, whether the user's operation is acceptable or not, and the voice guidance unit synthesizes voice guidance information indicating the disabled function and the reason thereof based on a result of determination of the determining unit, and outputs the synthesized voice guidance information by voice.

According to yet another aspect of the present invention, in the voice guidance system according to the first-mentioned aspect of the present invention, the detector comprises a job memory detector that detects a connection of a job memory storage device in which setting information of a predetermined function is prestored; and a determining unit that determines, upon detection of the connection of the job memory storage device by the job memory detector, whether the function registered in the job memory storage device is executable or not, and the voice guidance unit synthesizes voice guidance information indicating the disabled function and the reason thereof based on a result of determination of the determining unit, and outputs the synthesized voice guidance information by voice.

According to further aspect of the present invention, in the voice guidance system according to the first-mentioned aspect of the present invention, when a failure of high level of urgency and importance has occurred, the voice guidance unit outputs a voice guidance reporting the failure in preference to a voice guidance that is output in response to the detection output of the detector.

According to still further aspect of the present invention, in the voice guidance system according to the first-mentioned aspect of the present invention, when a failure of high level of urgency and importance has occurred, the voice guidance unit outputs voice guidance reporting the failure in a different way of reading out the message from that of other voice guidance that is output in response to the detection output of the detector.

According to yet further aspect of the present invention, a voice guidance method for a voice guidance system that provides a guidance by voice concerning operations of an information processing apparatus, comprises detecting, by detector, that a function of the information processing apparatus is disabled; and outputting, by a voice guidance unit, a voice guidance indicating the reason why the function of the information processing apparatus is disabled in response to the detection output of the detector.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A voice guidance system for providing a guidance by voice concerning operations of an image forming apparatus, comprising:

(1) an external terminal configured to be connectable to the image forming apparatus, and that changes a function of the image forming apparatus related to execution of a job as a result of a connection of the external terminal to the image forming apparatus;

(2) a detector that detects a connection of a job memory storage device in which setting information of a predetermined function of the image forming apparatus is prestored;

(3) a determining unit that determines, prior to executing the predetermined function, upon detection of the connection of the job memory storage device by the detector, whether the predetermined function whose setting information is prestored in the job memory storage device is executable in the image forming apparatus or not;

(4) a voice guidance unit that, if the determining unit determines that the predetermined function is not executable, synthesizes voice guidance information indicating that the predetermined function is not executable and a first reason why the function is not executable, and audibly outputs the synthesized voice guidance information; and (5) a priority level change unit configured to determine a priority level of the synthesized voice guidance information and to change an output order of the synthesized voice guidance information based on the priority level, wherein the voice guidance unit audibly outputs a second reason, in priority to the first reason based on the priority level determined by the priority level change unit, that indicates that the external terminal necessary for performing the predetermined function is not connected.

2. The voice guidance system according to claim 1, wherein the detector comprises:

an optional function detector that detects that an optional function is added to or removed from the image forming apparatus;

a user's operation detector that detects a user's operation performed on the image forming apparatus by a user; and a determining unit that determines, upon detection of the user's operation, whether the user's operation is acceptable or not, with reference to a detection result by the optional function detector, wherein the voice guidance unit synthesizes voice guidance information indicating the disabled function and the reason thereof based on a result of determination of the determining unit, and audibly outputs the synthesized voice guidance information.

3. The voice guidance system according to claim 1, wherein the detector comprises:

a user's operation detector that detects a user's operation performed on the image forming apparatus by a user; and a determining unit that determines whether the user's operation is acceptable or not, upon detection of the user's operation by the user's operation detector, wherein the voice guidance unit synthesizes voice guidance information indicating the disabled function and the reason thereof based on a result of determination of the determining unit, and audibly outputs the synthesized voice guidance information.

4. The voice guidance system according to claim 1, wherein, the voice guidance unit outputs a voice guidance reporting the failure in preference to a voice guidance that is output in response to the detection output of the detector, when a failure of high level of urgency and importance has occurred.

5. The voice guidance system according to claim 1, wherein the voice guidance unit outputs voice guidance reporting a failure of high level of urgency and importance has occurred in a different way than that of other voice guidance that is output in response to the detection output of the detector.

6. A voice guidance method for a voice guidance system that provides a guidance by voice concerning operations of an image forming apparatus, comprising:

(1) detecting, by a detector, a connection of a job memory storage device in which setting information of a predetermined function of the image forming apparatus is prestored; and (2) determining, by a determining unit, prior to executing a job using the predetermined function in the image forming apparatus, upon detection of the connection of the job memory storage device by the detector, whether the predetermined function whose setting information is prestored in the job memory storage device is executable in the image forming apparatus or not;

(3) synthesizing, if the determining unit determines that the predetermined function is not executable, voice guidance information indicating that the predetermined function is not executable and a first reason why the function is not executable, and audibly outputting the synthesized voice guidance information, by a voice guidance unit;

(4) determining, by a priority level change unit, a priority level of the synthesized voice guidance information and changing an output order of the synthesized voice guidance information based on the priority level, wherein the voice guidance system comprises an external terminal, configured to be connectable to the image forming apparatus, and that changes a function of the image forming apparatus related to execution of a job as a result of a connection of the external terminal to the image forming apparatus, and the voice guidance unit audibly outputs a second reason, in priority to the first reason based on the priority level determined by the priority level change unit, that indicates that the external terminal necessary for performing the predetermined function is not connected.

7. The voice guidance method according to claim 6, wherein the detecting by the detector comprises:

detecting that an optional function is added to or removed from the image forming apparatus;

detecting a user's operation performed on the image forming apparatus by a user; and determining, upon detection of the user's operation, whether the user's operation is acceptable or not, with reference to a result of the detection as to whether an optional function is added to or removed from the information processing apparatus, wherein the outputting of the voice guidance by the voice guidance unit includes:

synthesizing voice guidance information indicating the disabled function and the reason thereof based on a result of determination of the determining unit; and audibly outputting the synthesized voice guidance information.

8. The voice guidance method according to claim 6, wherein the detecting by the detector comprises:

detecting a user's operation performed on the image forming apparatus by a user; and determining, upon detection of the user's operation, whether the user's operation is acceptable or not, wherein the outputting of the voice guidance by the voice guidance unit includes:

synthesizing voice guidance information indicating the disabled function and the reason thereof based on a result of determination of the determining unit; and audibly outputting the synthesized voice guidance information.

9. The voice guidance method according to claim 6, wherein, the outputting of the voice guidance by the voice guidance unit includes outputting a voice guidance reporting a failure of high level of urgency and importance has occurred, in preference to a voice guidance that is output in response to the detection output of the detector.

10. The voice guidance method according to claim 6, wherein the outputting of the voice guidance by the voice guidance unit includes outputting a voice guidance reporting a failure of high level of urgency and importance has occurred, in a different way of reporting the message from that of other voice guidance that is output in response to the detection output of the detector.

11. A voice guidance system for providing a guidance by voice concerning operations of an image forming apparatus, comprising:

(1) dedicated apparatus, configured to be connectable to the image forming apparatus, and that changes a function related to a job to be performed in the image forming apparatus as a result of a connection of the dedicated apparatus;

(2) a job memory storage device detection unit that detects a connection of a job memory storage device in which setting information of a predetermined function of the image forming apparatus is prestored;

(3) a job function extraction unit that, upon detecting the connection of the job memory storage device by the job memory storage device detection unit, extracts an optional function added to the image forming apparatus by the connection of the dedicated apparatus to the image forming apparatus;

(4) a setting information reading unit that reads the setting information from the job memory storage device upon detecting the connection of the job memory storage device by the job memory storage device detection unit;

(5) a determination unit that determines whether the function, including the optional function extracted by the job function extraction unit, of the image forming apparatus corresponding to the setting information read by the setting information reading unit is available in the image forming apparatus or not, prior to executing the job using the predetermined function by the image forming apparatus, upon detecting the connection of the job memory storage device by the job memory storage device detection unit;

(6) a voice guidance unit that, if the determination unit determines that the predetermined function of the image forming apparatus is not available, synthesizes voice guide information indicating the nonavailability of the predetermined function and a first reason why the function is not available, and audibly outputs the synthesized voice guide information; and (7) a priority level change unit configured to determine a priority level of the synthesized voice guidance information and to change an output order of the synthesized voice guidance information based on the priority level, wherein the voice guidance unit audibly outputs a second reason, in priority to the first reason based on the priority level determined by the priority level change unit, that the dedicated apparatus necessary for performing the predetermined function is not connected.

12. A voice guidance method of a voice guidance system for providing a guidance by voice concerning operations of an image forming apparatus, comprising:

(1) detecting, by a job memory storage device detection unit, a connection of a job memory storage device in which setting information of a predetermined function of the image forming apparatus is stored;

(2) reading, by a setting information reading unit, the setting information from the job memory storage device upon detecting the connection of the job memory storage device by the job memory storage device detection unit;

(3) determining, by a determination unit, whether a function, including an optional function extracted by a job function extraction unit, of the image forming apparatus corresponding to the setting information read by the setting information reading unit is available in the image forming apparatus or not, prior to executing a job using the predetermined function by the image forming apparatus, upon detecting the connection of the job memory storage device by the job memory storage device detection unit, the optional function being added to the image forming apparatus as a result of connection of a dedicated apparatus to the image forming apparatus and being extracted by the job function extraction unit upon detecting the connection of the job memory storage device;

(4) synthesizing voice guide information indicating the nonavailability of the predetermined function and a first reason why the function is not available, and audibly outputting the synthesized voice guide information, by a voice guidance unit, if the determination unit determines that the predetermined function is not available; and (5) determining, by a priority level change unit, a priority level of the synthesized voice guide information and changing an output order of the synthesized voice guide information based on the priority level, wherein the dedicated apparatus is configured to be connectable to the image forming apparatus, and changes the function related to a job to be performed in the image forming apparatus as a result of a connection of the dedicated apparatus, and the voice guidance unit audibly outputs a second reason, in priority to the first reason based on the priority level determined by the priority level change unit, that the dedicated apparatus necessary for performing the predetermined function is not connected.

13. A voice guidance system for providing a guidance by voice concerning operations of an image forming apparatus, comprising:

an external terminal that changes a function related to a job to be performed in the image forming apparatus as a result that the external terminal is connected to the image forming apparatus, the external terminal including a job memory storage device in which setting information of a predetermined function of the image forming apparatus is prestored;

a determining unit that determines, prior to executing a job using the predetermined function, whether the predetermined function related to the job is executable or not;

a voice guidance unit that, if the determining unit determines that the predetermined function is not executable, synthesizes voice guidance information indicating that the predetermined function is not executable and a first reason why the function is not executable, and audibly outputs the synthesized voice guidance information; and a priority level change unit configured to determine a priority level of the synthesized voice guidance information and to change an output order of the synthesized voice guidance information based on the priority level, wherein the voice guidance unit audibly outputs a second reason, in priority to the first reason based on the priority level determined by the priority level change unit, that the external terminal necessary for performing the predetermined function is not connected.

14. A voice guidance system for providing a guidance by voice concerning operations of an image forming apparatus, comprising:

an external terminal connected to the image forming apparatus, on which a function related to the job is changed including a job memory storage device in which setting information of a predetermined function of the image forming apparatus is prestored;

a determining unit that determines, prior to executing the function, whether the function related to the job is executable or not;

a voice guidance unit that audibly outputs a second reason, in priority to a first reason, indicating a disabled function based on a result of determination of the determining unit; and a priority level change unit configured to determine a priority level of the first reason and second reason outputted by the voice guidance unit and to change an output order of the first reason and the second reason based on the priority level.

15. A voice guidance system for providing a guidance by voice concerning operations of an image forming apparatus, comprising:

an external terminal connected to the image forming apparatus, on which a function related to the job is changed including a job memory storage device in which setting information of a predetermined function of the image forming apparatus is prestored;

a determining unit that determines, prior to executing the function, whether the function related to the job is executable or not; and a voice guidance unit that audibly outputs a voice guidance information, including a disabled function, based on a result of determination of the determining unit, wherein the voice guidance unit audibly outputs a reason of the disabled function in priority to other information under the condition that the reason of the disabled function is that the external terminal is not connected to the image forming apparatus.

16. A voice guidance system for providing a guidance by voice concerning operations of an image forming apparatus, comprising:

(1) an external terminal, configured to be connectable to the image forming apparatus, and that changes a function of the image forming apparatus related to execution of a job as a result of a connection of the external terminal to the image forming apparatus;

(2) a detector that detects a connection of a job memory storage device in which setting information of a predetermined function of the image forming apparatus is prestored;

(3) a determining unit that determines, prior to executing the predetermined function, upon detection of the connection of the job memory storage device by the detector, whether the predetermined function whose setting information is prestored in the job memory storage device is executable in the image forming apparatus or not; and (4) a voice guidance unit that, if the determining unit determines that the predetermined function is not executable, synthesizes voice guidance information indicating that predetermined function is not executable and a reason why the function is not executable, and if the reason why the function is not executable includes that the external terminal necessary for performing the predetermined function is not connected, synthesizes the voice guidance information and audibly outputs the synthesized voice guidance information indicating that the external terminal necessary for performing the predetermined function is not connected in priority to another reason.

17. A voice guidance method for a voice guidance system that provides a guidance by voice concerning operations of an image forming apparatus, comprising:

(1) detecting, by a detector, a connection of a job memory storage device in which setting information of a predetermined function of the image forming apparatus is prestored;

(2) determining, by a determining unit, prior to executing a job using the predetermined function in the image forming apparatus, upon detection of the connection of the job memory storage device by the detector, whether the predetermined function stored in the job memory storage device is executable in the image forming apparatus or not; and (3) synthesizing, if the determining unit determines that the predetermined function is not executable, voice guidance information indicating that the predetermined function is not executable and a reason why the function is not executable, and audibly outputting the synthesized voice guidance information, by a voice guidance unit and, if the reason why the function is not executable includes that the external terminal, which changes a function of the image forming apparatus related to execution of a job as a result of connection to the image forming apparatus, is not connected, synthesizing and audibly outputting the voice guidance information indicating the external terminal is not connected in priority to another reason.

18. A voice guidance system for providing a guidance by voice concerning operations of an image forming apparatus, comprising:

(1) a dedicated apparatus, configured to be connectable to the image forming apparatus, and that changes a function related to a job to be performed in the image forming apparatus as a result of connection of the dedicated apparatus;

(2) a job memory storage device detection unit that detects a connection of a job memory storage device in which setting information of a predetermined function of the image forming apparatus is prestored;

(3) a job function extraction unit that, upon detecting connection of the job memory storage device by the job memory storage device detection unit, extracts an optional function added to the image forming apparatus by the connection of the dedicated apparatus to the image forming apparatus;

(4) a setting information reading unit that reads the setting information from the job memory storage device upon detecting the connection of the job memory storage device by the job memory storage device detection unit;

(5) a determination unit that determines whether the function, including the optional function extracted by the job function extraction unit, of the image forming apparatus corresponding to the setting information read by the setting information reading unit is available in the image forming apparatus or not, prior to executing the job using the predetermined function by the image forming apparatus, upon detecting the connection of the job memory storage device by the job memory storage device detection unit; and (6) a voice guidance unit that, if the determination unit determines that the predetermined function of the image forming apparatus is not available, synthesizes voice guide information indicating the nonavailablity of the predetermined function and a reason why the function is not available and, if the reason why the function is not executable includes that the dedicated apparatus that changes a function of the image forming apparatus related to execution of a job is not connected, synthesizing and audibly outputting the voice guidance information indicating that the dedicated apparatus is not connected in priority to another reason.

19. A voice guidance method of a voice guidance system for providing a guidance by voice concerning operations of an image forming apparatus, comprising:

(1) detecting, by a job memory storage device detection unit, a connection of a job memory storage device in which setting information of a predetermined function of the image forming apparatus is stored;

(2) reading, by a setting information reading unit, the setting information from the job memory storage device upon detecting the connection of the job memory storage device by the job memory storage device detection unit;

(3) determining, by a determination unit, whether a function, including an optional function extracted by a job function extraction unit, of the image forming apparatus corresponding to the setting information read by the setting information reading unit is available in the image forming apparatus or not, prior to executing a job using the predetermined function by the image forming apparatus, upon detecting the connection of the job memory storage by the job memory storage device detection unit, the optional function being added to the image forming apparatus as a result of connection of a dedicated apparatus to the image forming apparatus and being extracted by the job function extraction unit upon detecting the connection of the job memory storage device; and (4) synthesizing, if the determination unit determines that the predetermined function is not available, voice guide information indicating the nonavailablity of the predetermined function and a reason why the function is not available and, if the reason why the function is not executable includes that the dedicated apparatus that changes a function of the image forming apparatus related to execution of a job is not connected, synthesizing and audibly outputting the voice guidance information indicating that the dedicated apparatus is not connected in priority to another reason.

20. A voice guidance system for providing a guidance by voice concerning operations of an image forming apparatus, comprising:

an external terminal that changes a function related to a job to be performed in the image forming apparatus as a result that the external device is connected to the image forming apparatus, the external terminal including a job memory storage device in which setting information of a predetermined function of the image forming apparatus is prestored;

a determining unit that determines, prior to executing a job using the predetermined function, whether the predetermined function related to the job is executable or not; and a voice guidance unit that, if the determining unit determines that the predetermined function is not executable, synthesizes voice guidance information indicating that the predetermined function is not executable and a reason why the function is not executable, and, if the reason why the predetermined function is not executable includes that the external terminal is not connected, synthesizes and audibly outputs the voice guidance information indicating that the external terminal is not connected in priority to another reason.

21. A voice guidance system for providing a guidance by voice concerning operations of an image forming apparatus, comprising:

an external terminal connected to the image forming apparatus, on which a function related to the job is changed including a job memory storage device in which setting information of a predetermined function of the image forming apparatus is prestored;

a determining unit that determines, prior to executing the function, whether the function related to the job is executable or not;

a voice data acquiring unit that, if the determining unit determines that the predetermined function is not executable, acquires voice data which guides the function which is determined not to be executable and voice data which guides a reason why the function is not executable respectively from a voice data storing unit;

a priority level changing unit that, if the voice data acquired by the voice data acquiring unit which guides the reason includes voice data which indicates that the external terminal is not connected, determines an order of outputting of the voice data acquired by the voice data acquiring unit based on a predetermined priority level so that the voice data which indicates that the external terminal is not connected is first output audibly in priority to other voice data;

a voice data synthesizing unit that generates voice guidance data by sorting the voice data acquired by the voice data acquiring unit according to the output order determined by the priority level changing unit and by synthesizing the voice data; and a voice guidance unit that audibly outputs based on the voice guidance data generated by the voice data synthesizing unit.

22. A voice guidance system for providing a guidance by voice concerning operations of an image forming apparatus, comprising:

an external terminal, configured to be connectable to the image forming apparatus, and that changes a function of the image forming apparatus related to execution of a job as a result of a connection of the external terminal to the image forming apparatus;

a detector that detects a connection of a job memory storage device in which setting information of a predetermined function of the image forming apparatus is prestored;

a determining unit that determines, prior to executing the predetermined function, upon detection of the connection of the job memory storage device by the detector, whether the predetermined function whose setting information is prestored in the job memory storage device is executable in the image forming apparatus or not, and a voice data acquiring unit that, if the determining unit determines that the predetermined function is not executable, acquires voice data which guides the function which is determined not to be executable and voice data which guides a reason why the function is not executable respectively from a voice data storing unit;

a priority level changing unit that, if the voice data acquired by the voice data acquiring unit which guides the reason includes voice data which indicates that the external terminal is not connected, determines an order of outputting of the voice data acquired by the voice data acquiring unit based on a predetermined priority level so that the voice data which indicates that the external terminal is not connected is first output audibly in priority to other voice data;

a voice data synthesizing unit that generates voice guidance data by sorting the voice data acquired by the voice data acquiring unit according to the output order determined by the priority level changing unit and by synthesizing the voice data; and a voice guidance unit that audibly outputs based on the voice guidance data generated by the voice data synthesizing unit.

23. A voice guidance method for a voice guidance system that provides a guidance by voice concerning operations of an image forming apparatus, comprising:

detecting, by a detector, a connection of a job memory storage device in which setting information of a predetermined function of the image forming apparatus is prestored;

and determining, by a determining unit, prior to executing a job using the predetermined function in the image forming apparatus, upon detection of the connection of the job memory storage device by the detector, whether the predetermined function stored in the job memory storage device is executable in the image forming apparatus or not;

acquiring, by a voice data acquiring unit, if it is determined by the determining unit that the predetermined function is not executable, voice data which guides the function which is determined not to be executable and voice data which guides a reason why the function is not executable respectively from a voice data storing unit;

determining, by a priority level changing unit, if the voice data acquired by the voice data acquiring unit which guides the reason includes voice data which indicates that the external terminal is not connected, an order of outputting of the voice data acquired by the voice data acquiring unit based on a predetermined priority level so that the voice data which indicates that the external terminal is not connected is first output audibly in priority to other voice data;

generating, by a voice data synthesizing unit, voice guidance data by sorting the voice data acquired by the voice data acquiring unit according to the output order determined by the priority level changing unit and by synthesizing the voice data; and audibly outputting, by a voice guidance unit, based on the voice guidance data generated by the voice data synthesizing unit.

24. A voice guidance system for providing a guidance by voice concerning operations of an image forming apparatus, comprising:

a dedicated apparatus, configured to be connectable to the image forming apparatus, and that changes a function related to a job to be performed in the image forming apparatus as a result of connection of the dedicated apparatus;

a job memory storage device detection unit that detects a connection of a job memory storage device in which setting information of a predetermined function of the image forming apparatus is prestored;

an optional function extraction unit that, upon detecting connection of the job memory storage device by the job memory storage device detection unit, extracts an optional function added to the image forming apparatus by the connection of the dedicated apparatus to the image forming apparatus;

a setting information reading unit that reads the setting information from the job memory storage device upon detecting the connection of the job memory storage device by the job memory storage device detection unit;

a determination unit that determines whether the function, including the optional function extracted by the job function extraction unit, of the image forming apparatus corresponding to the setting information read by the setting information reading unit is available in the image forming apparatus or not, prior to executing the job using the predetermined function by the image forming apparatus, upon detecting the connection of the job memory storage device by the job memory storage device detection unit;

a voice data acquiring unit that, if the determining unit determines that the function of the image forming apparatus is not executable, acquires voice data which guides the function of the image forming apparatus which is determined not to be executable and voice data which guides a reason why the function is not executable respectively from a voice data storing unit;

a priority level changing unit that, if the voice data acquired by the voice data acquiring unit which guides the reason includes the voice data which indicates that the job memory storage device is not connected, determines an order of outputting of the voice data acquired by the voice data acquiring unit based on a predetermined priority level so that the voice data which indicates that the job memory storage device is not connected is first output audibly in priority to other voice data;

a voice data synthesizing unit which generates voice guidance data by sorting the voice data acquired by the voice data acquiring unit according to the output order determined by the priority level changing unit and by synthesizing the voice data; and a voice guidance unit which audibly outputs based on the voice guidance data generated by the voice data synthesizing unit.

25. A voice guidance method of a voice guidance system for providing a guidance by voice concerning operations of an image forming apparatus, comprising:

detecting, by a job memory storage device detection unit, a connection of a job memory storage device in which setting information of a predetermined function of the image forming apparatus is stored;

extracting, by an optional function extraction unit, upon detecting connection of the job memory storage device by the job memory storage device detection unit, an optional function added to the image forming apparatus by the connection of a dedicated apparatus to the image forming apparatus;

reading, by a setting information reading unit, the setting information from the job memory storage device upon detecting the connection of the job memory storage device by the job memory storage device detection unit;

determining, by a determination unit, whether a function, including an optional function extracted by a job function extraction unit, of the image forming apparatus corresponding to the setting information read by the setting information reading unit is available in the image forming apparatus or not, prior to executing a job using the predetermined function by the image forming apparatus, upon detecting the connection of the job memory storage device by the job memory storage device detection unit;

acquiring, by a voice data acquiring unit, if it is determined by the determining unit that the function of the image forming apparatus is not executable, voice data which guides the function of the image forming apparatus which is determined not to be executable and voice data which guides a reason why the function is not executable respectively from a voice data storing unit;

determining, by a priority level changing unit, if the voice data acquired by the voice data acquiring unit which guides the reason includes voice data which indicates that the job memory storage device is not connected, an order of outputting of the voice data acquired by the voice data acquiring unit based on a predetermined priority level so that the voice data which indicates that the job memory storage device is not connected is first output audibly in priority to other voice data;

generating, by a voice data synthesizing unit, voice guidance data by sorting the voice data acquired by the voice data acquiring unit according to the output order determined by the priority level changing unit and by synthesizing the voice data; and audibly outputting, by a voice guidance unit, based on the voice guidance data generated by the voice data synthesizing unit.

26. A voice guidance system for providing a guidance by voice concerning operations of an image forming apparatus, comprising:

an external terminal that changes a function related to a job to be performed in the image forming apparatus as a result that the external device is connected to the image forming apparatus, the external terminal including a job memory storage device in which setting information of a predetermined function of the image forming apparatus is prestored;

a determining unit that determines, prior to executing a job using the predetermined function, whether the predetermined function related to the job is executable or not; and a voice data acquiring unit that, if the determining unit determines that the predetermined function is not executable, acquires voice data which guides the function which is determined not to be executable and voice data which guides a reason why the function is not executable respectively from a voice data storing unit;

a priority level changing unit that, if the voice data acquired by the voice data acquiring unit which guides the reason includes voice data which indicates that the external terminal including the job memory storage device is not connected, determines an order of outputting of the voice data acquired by the voice data acquiring unit based on a predetermined priority level so that the voice data which indicates that the external terminal including the job memory storage device is not connected is first output audibly in priority to other voice data;

a voice data synthesizing unit which generates voice guidance data by sorting the voice data acquired by the voice data acquiring unit according to the output order determined by the priority level changing unit and by synthesizing the voice data; and a voice guidance unit which audibly outputs based on the voice guidance data generated by the voice data synthesizing unit.

* * * * *